J. J. WITTLINGER.
POWER TRANSMISSION MECHANISM.
APPLICATION FILED OCT. 19, 1918.

1,305,760.

Patented June 3, 1919.

Witness
L. S. Woodhull

Inventor
John J. Wittlinger
By B. P. Wheeler
Attorney

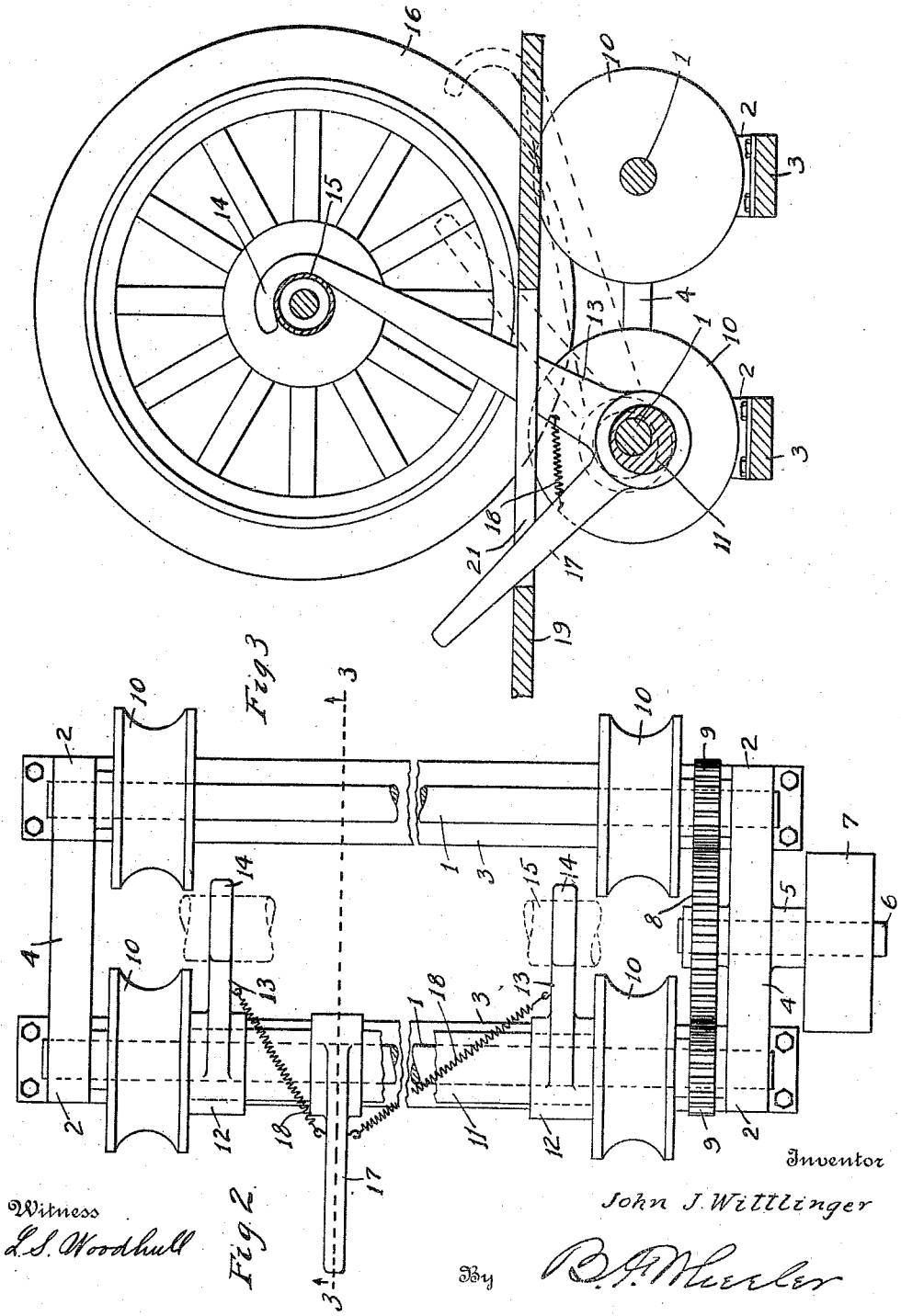

UNITED STATES PATENT OFFICE.

JOHN J. WITTLINGER, OF DETROIT, MICHIGAN.

POWER-TRANSMISSION MECHANISM.

1,305,760.  Specification of Letters Patent.  Patented June 3, 1919.

Application filed October 19, 1918. Serial No. 258,780.

*To all whom it may concern:*

Be it known that I, JOHN J. WITTLINGER, a citizen of the United States, residing at Detroit, in the county of Wayne and State of Michigan, have invented a new and useful Power-Transmission Mechanism, of which the following is a specification.

This invention relates to power transmitting mechanism and more particularly to mechanisms adapting the power of a vehicle motor to be utilized for other purposes than that of propelling the vehicle.

It is the object of the invention to provide a simple portable mechanism of the character above mentioned which will comprise grooved friction wheels upon which the drive wheels of the motor vehicle may rest while actuating the same, and which further will comprise means readily engageable with the driving axle of the vehicle to maintain the desired driving relation.

A preferred embodiment of the invention is illustrated in the accompanying drawings, wherein, Figure 1 is a view in side elevation of the lower rear portion of an automobile, showing a driving wheel thereof in actuating relation with the invention.

Fig. 2 is a top view of the invention.

Fig. 3 is a sectional view taken on line 3—3 of Fig. 2, including a showing of a motor vehicle drive axle and wheel, the axle being engaged by a device maintaining the driving relation.

Figure 1:
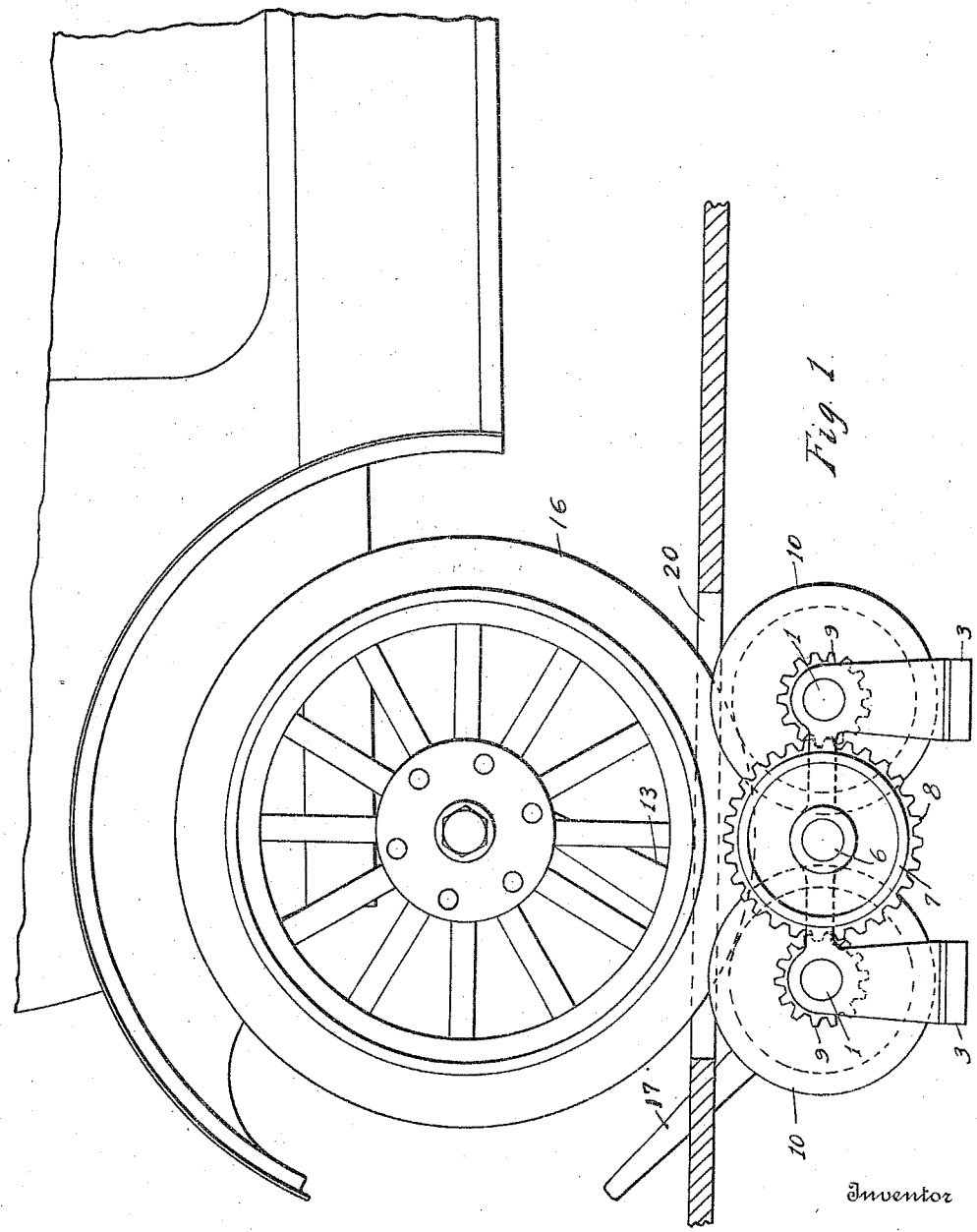

In these views the reference character 1 designates a pair of parallel adjacent shafts, the extremities of which are journaled in brackets 2 bolted to the ends of planks 3, extending respectively beneath said shafts. Preferably said brackets are rigidly connected by bars 4 which in this instance are shown formed integral with the brackets which they connect. Midway of one of said bars there is formed a bearing 5 for a stub shaft 6, having mounted upon its outer end a pulley 7 and upon its inner end a gear 8, intermeshed with pinions 9 respectively mounted fast upon the shafts 1. Upon said shafts there are also mounted fast two pairs of grooved wheels 10 arranged in such a relation that each pair may co-act to support one of the driving wheels of a motor vehicle. The portion of one of the shafts 1 intermediate the wheels 10 has loosely mounted thereupon an eccentric sleeve 11 and upon the ends of said sleeves there are loosely mounted collars 12 each being similarly provided with an arm 13 integrally projecting therefrom and hooked at its free end as indicated at 14 to engage a vehicle rear axle 15. One of the wheels 16 of said axle is shown in the drawings resting upon a pair of the wheels 10. The sleeve 11 has mounted fast thereupon an actuating lever 17 which is yieldably attached to each of the arms 13, as for example by the coiled springs 18. A platform or garage floor beneath which the invention is disposed is indicated in the drawing at 19, and 20 and 21 are openings formed in the member 19 to respectively accommodate the wheels 16 and the lever 17.

In the use of the above-described invention, after the drive wheels of a motor vehicle have been positioned upon the grooved wheels 10 as shown in the drawings, the lever 17 is swung rearwardly, and through the springs 18 a rearward movement of the arms 13 is also effected, the forward and rearward positions of said lever and arms being illustrated respectively in dash lines and full lines in Fig. 3. The rearward movement of the arms 13 is soon arrested by their contact with the axle 15, but the lever 17 is shifted through a considerable angle, the springs 18 meanwhile being tensioned and the arms 13 being shifted radially of the shaft carrying the sleeve 11 to engage the hooks 14 firmly with said axle. This adjustment having been made, when the vehicle motor is started and the wheels 16 are driven they will through friction actuate the grooved wheels 10, and the latter through the gears 8 and 9 will drive the pulley 7. From said pulley a belt (not shown) may transmit power to any desired mechanism. The hooked arms 13 will act through the axle 15 to prevent any disengagement of the vehicle wheels 16 from the wheels 10 until the lever 17 has been swung back to its forward position.

What I claim is:

1. In a power transmitting mechanism, the combination with a wheel grooved to have frictional engagement with a vehicle drive wheel and a pulley driven by said grooved wheel, of a pivoted hooked arm for engagement with the axle of a motor vehicle to maintain a wheel of said axle engaged with said grooved wheel, and means for first swinging said arm into contact with said axle and then shifting the arm longitudinally to engage the hook thereof with the axle.

2. In a power transmitting mechanism, the combination with a wheel grooved to have frictional engagement with a vehicle drive wheel and a pulley driven by said grooved wheel, of an arm hooked for engagement with a motor vehicle axle to maintain a wheel of said axle engaged with said grooved wheel, an eccentrically mounted sleeve on which said arm is loosely mounted and a lever engaged with said sleeve for turning said sleeve subsequent to engagement of the arm with the axle to shift said arm longitudinally and engage the hook thereof with the axle.

3. In a power transmitting mechanism, the combination with a pair of parallel adjacent shafts, of two pairs of grooved wheels, the wheels of each pair being respectively oppositely mounted upon said shafts, and engageable by one of the drive wheels of a motor vehicle, a sleeve eccentrically mounted upon one of said shafts, an arm loosely mounted on said sleeve and hooked to engage a vehicle axle for maintaining the wheels thereof engaged with said grooved wheels, a lever rigidly secured to said sleeve, and a yieldable connection between said lever and arm.

In testimony whereof I sign this specification.

JOHN J. WITTLINGER.

Copies of this patent may be obtained for five cents each, by addressing the "Commissioner of Patents, Washington, D. C."